Dec. 31, 1963 E. R. ANDREGG ETAL 3,116,370

TELEPHONE PAY STATION

Filed May 5, 1959 3 Sheets-Sheet 1

INVENTORS E. R. ANDREGG M. S. HAWLEY W. PFERD

BY V. P. Triolo

ATTORNEY

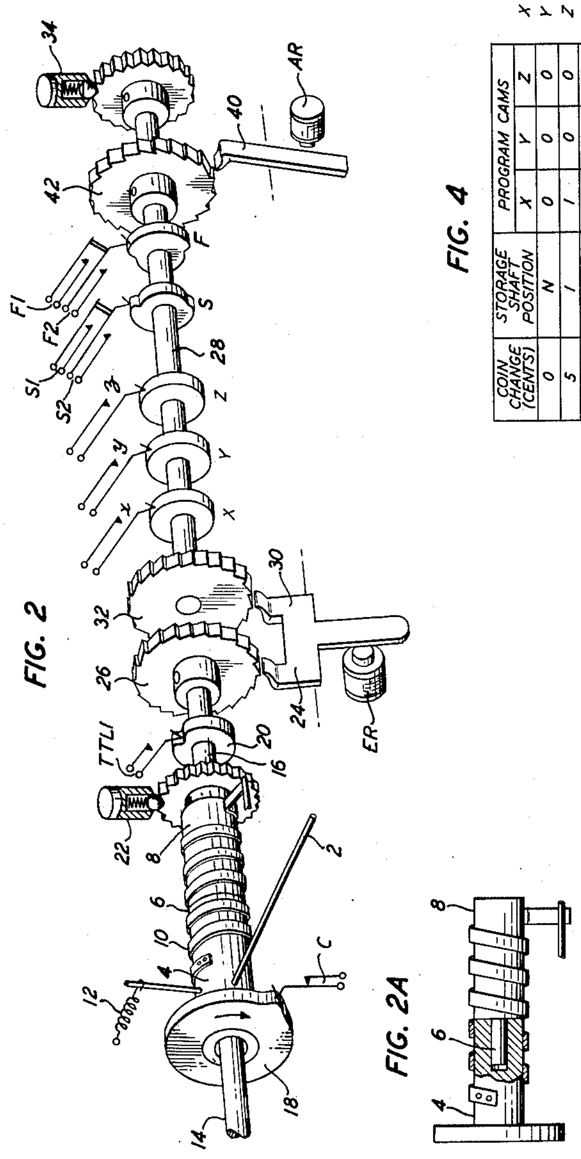
FIG. 2, FIG. 2A
| COIN CHANGE (CENTS) | STORAGE SHAFT POSITION | PROGRAM CAMS X | PROGRAM CAMS Y | PROGRAM CAMS Z |
|---|---|---|---|---|
| 0 | N | 0 | 0 | 0 |
| 5 | 1 | 1 | 0 | 0 |
| 10 | 2 | 0 | 1 | 0 |
| 15 | 3 | 1 | 0 | 0 |
| 20 | 4 | 0 | 1 | 0 |
| 25 | 5 | 0 | 0 | 1 |
| 30 | 6 | 1 | 0 | 0 |
| 35 | 7 | 0 | 1 | 0 |
| 40 | 8 | 1 | 0 | 0 |
| 45 | 9 | 0 | 1 | 0 |
| 50 | 10 | 0 | 0 | 1 |
| 55 | 11 | 1 | 0 | 0 |
| 60 | 12 | 0 | 1 | 0 |
| 65 | 13 | 1 | 0 | 0 |
| 70 | 14 | 0 | 1 | 0 |
| 75 | 15 | 0 | 0 | 1 |
| 80 | 16 | 1 | 0 | 0 |
| 85 | 17 | 0 | 1 | 0 |
| 90 | 18 | 1 | 0 | 0 |
| 95 | 19 | 0 | 1 | 0 |
X = 5c CAM
Y = 10c CAM
Z = 25c CAM
0 = CONTACTS NORMAL
1 = CONTACTS TRANSFERRED
FIG. 4
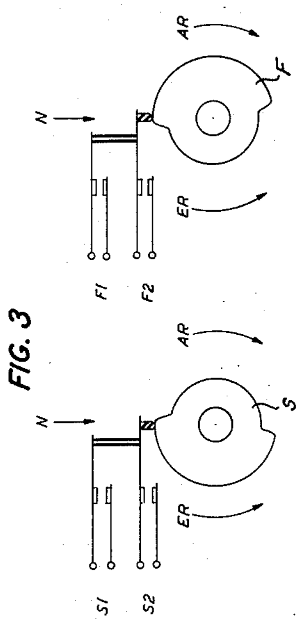
FIG. 3
INVENTORS E. R. ANDREGG
M. S. HAWLEY
W. PFERD
BY V. P. Triolo
ATTORNEY

INVENTORS E. R. ANDREGG
M. S. HAWLEY
W. PFERD
BY
ATTORNEY

United States Patent Office 3,116,370

Patented Dec. 31, 1963

3,116,370

TELEPHONE PAY STATION

Ernest R. Andregg, Newark, Melville S. Hawley, Summit, and William Pferd, Watchung, N.J., assignors to Bell Telephone Laboratories, Incorporated, New York, N.Y., a corporation of New York Filed May 5, 1959, Ser. No. 811,047
10 Claims. (Cl. 179—6.3)

This invention relates to telephone pay stations and more particularly to telephone pay stations employing coin collector circuits.

The telephone pay station, as generally known in the art, is an example of the progressive application of automation to the telephone industry. The dial telephone pay station is equipped with coin collector circuits which provide automatic means for the collection and refund of deposits, for informing the central office of the amount of deposit, and for preventing the use of telephone service until the correct deposit has been made. However, the assistance of an operator is still required with present day dial telephone pay stations for the monitoring of deposits for calls other than single unit or local calls. This monitoring is accomplished through the use of gongs and chimes located in the telephone pay station. The gongs and chimes are struck by the deposited coins and the particular gong or chime struck transmits an audible identifying tone to the central office. This system of central office verification of the deposit necessitates immediate transmittal of the audible deposit tone since there is no practical way of storing the tone of a gong or chime. Therefore, the operator must monitor the deposit of each coin and supervise each call beyond the local range from the time of initiation until sufficient deposit is made to pay for the service requested.

With the current expansion of direct dialing facilities the trend of the telephone industry is toward complete automation. To achieve complete automation it is necessary to provide a system of automatic deposit verification and control that will handle all calls from telephone pay stations without any operator assistance whatever.

An object of the present invention is the provision of a practical automatic deposit verification system which will establish calls without the assistance of an operator.

Another object of the present invention is the provision of automatic means for informing the pay station subscriber as to whether or not the amount he has deposited is sufficient for the service requested.

A further object of the present invention is the provision of means for automatically storing the amount of deposit and refunding the excess deposit when the call is terminated.

A feature of the invention resides in the coin totalizing and switching mechanism disposed at the pay station which, in response to the coins deposited and to signals transmitted from the central office, controls means for translating coin information stored in terms of nickel increments to coin refunds in terms of nickel, dime and quarter denominations.

This and other features, and the nature of the invention will be more clearly understood from the following detailed description and the accompanying drawings in which:

FIG. 2 is a structural schematic of the coin totalizing and switching mechanism showing the essential elements thereof in perspective;

FIG. 2A is a sectional view of the clutch arrangement included in the totalizing mechanism;

FIG. 3 is a functional view of two of the control cams actuated by the totalizing mechanism shown in FIG. 2;

FIG. 4 is a chart illustrating a typical coin change program in which the least number of coins are returned;

Figures 1, 5:
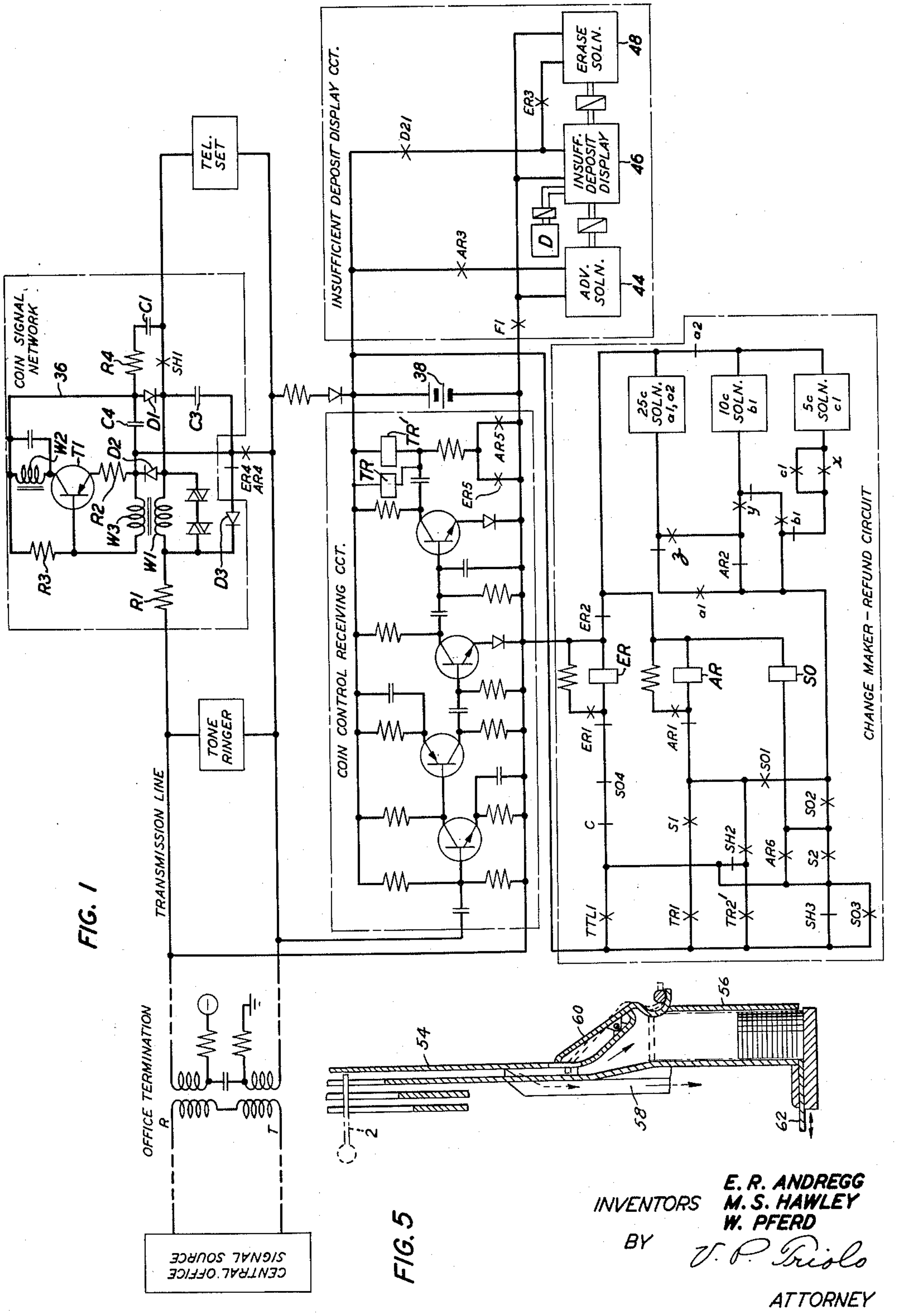
FIG. 1 is a circuit schematic of a preferred embodiment of the invention showing the features disposed at the pay station and the connection between pay station and central office.
FIG. 5 is a sectional view of a coin storing and ejecting device.

Referring to FIG. 2 of the drawing, the totalizing mechanism comprises a totalizer section, and a storage section. The components disposed on the totalizer section are basically the same as those shown on the mechanical coin totalizer disclosed in Patent No. 2,929,479, granted to William Pferd on March 22, 1960. These components comprise a coin finger 2 which is moved, when contacted by a deposited coin, clockwise through an angle which bears a direct relationship to the face value of the coin deposited in the coin collector, and a sleeve member 4 to which coin finger 2 is secured, and which is provided with a coaxial bore into which a reduced section 6 of shaft or cylinder 8 fits. The elements 4 and 8 constitute two cylinders having a common axis of rotation and torsionally coupled by the friction between them and a coil spring 10 disposed over each of them. The cylinder 4, to which the coin finger 2 is secured in any suitable manner, is regarded as the driving cylinder and the cylinder 8 as the driven cylinder. When the driving cylinder 4 is rotated in a clockwise direction the spring 10 is wound in a direction tending to decrease its diameter so that a substantial positive coupling torque is produced and the driven cylinder 8 follows the clockwise rotation of cylinder 4. When the driving cylinder is rotated counterclockwise under the influence of spring 12, the coupling torque is substantially lessened and the cylinder 8 does not tend to follow cylinder 4. Cylinder 4 terminates one end of shaft 14 while cylinder 8 terminates one end of shaft 16. Cam 18 mounted on shaft 14 controls contact C which opens when a coin actuates coin finger 2 and thereby rotates cylinder 4. Cam 20 mounted on shaft 16 controls contact TTL1 which closes when a coin actuates finger 2 causing cylinder 4 to drive cylinder 8. As will be explained hereinafter, detent 22 holds shaft 16 in the position to which it is driven by cylinder 4 until it is stepped back through the stepping pawl 24 and ratchet wheel 26 by self-stepping erase relay ER.

Mounted on shaft 28 of the storage section of the totalizing mechanism are the storage control cam S, the insufficient deposit display control cam F and the coin change program control cams X, Y and Z. As will be explained, hereinafter, the rotation of shaft 28 is controlled through the stepping pawl 30 and ratchet wheel 32 by the self-stepping erase relay ER and by the advance relay AR. When not rotated by either of these relays the shaft is held in position by the detent 34. It will be understood that a deposited coin will rotate shaft 16 in a clockwise direction, relay ER will rotate both shafts 16 and 28 in a counterclockwise direction, and relay AR will rotate shaft 28 in a clockwise direction.

Referring to FIG. 1, when a ringing circuit is connected to the tip and ring loop conductors T and R to signal an incoming call, condenser C1 accumulates a direct current charge during the period that the switchhook contacts SH1 are open. The charging circuit for condenser C1 may be traced from the tip conductor T through the telephone set, capacitor C1, resistor R4, diode D1, winding W1, and resistor R1 to the ring conductor. When the contacts SH1 are closed as a result of lifting the handset from its cradle, capacitor C1 is permitted to discharge over a circuit including the closed switchhook contacts SH1, diode D2, resistor R2, transistor T1 through resistor R3 and winding W2, and resistor R4. During the time that the capacitor C1 is supplying current to the generator, a potential is developed between the collector and base and between the base and emitter of transistor T1. Variation of the collector current which flows through winding W2 causes regenerative action through winding W3. This develops an oscillatory current whose frequency is determined by the circuit constants and whose amplitude is limited by the value of the voltage supplied to the generator. Since windings W1, W2 and W3 are all inductively coupled, the output from winding W2 is transmitted to the line loop by winding W1. The tone thus impressed on the line conductors is received at the central office and indicates to the operator that the terminating station is a pay station. This station identifying circuit may also be used, as described hereinafter, for providing audible tone pulsing for operator recognition of the amount of deposit.

On outgoing calls the proper sequence is to first deposit the local rate and then dial. When coins are deposited they contact finger 2 and cause the totalizer section of the totalizer mechanism to rotate through the number of angular degrees corresponding to the value of the coins in nickel increments. When the totalizer section starts to rotate contact C opens and contact TTL1 closes. After the coins have passed the finger 2, cylinder 4, to which finger 2 is secured, will return to its normal position under the influence of spring 12, while cylinder 8, and cam 20 and ratchet wheel 26 secured thereto, will be retained in the rotated position by detent 22. When cylinder 4 returns to its normal position cam 18 will cause contact C to close. With contact C closed and contact TTL1 closed relay ER will be energized by means of the circuit including battery 38, operated contact TTL1 and normally closed contacts C, $SO_4$ and ER1. Through the breaking and making of contact ER1 relay ER will be energized intermittently to cause pawls 24 and 30 to step wheels 26 and 32 in a counterclockwise direction until cam 20 returns to its neutral position and causes contact TTL1 to open.

During the time relay ER is stepping cam 20 to its neutral position, contact ER4 alternately transfers placing capacitor C3 across the telephone set and energizing the pay station identifier oscillator 36. The circuit for energizing oscillator 36 is established from the central office potential source over the tip conductor, through operated contact ER4, resistor R2, transistor T1 through resistor R3 and winding W2, diode D1, winding W1, resistor R1, and the ring conductor to the central office potential source. This provides audible tone pulsing for operator recognition of the amount of the deposit. One tone pulse represents a nickel, two pulses in succession represent a dime, and five pulses in succession represent a quarter. The discharge of capacitor C3 through diode 3 shunts winding W1 and stops the oscillator. The coin deposit information which is transmitted as an audible signal to the central office is also stored on the storage section of the totalizer mechanism by the simultaneous stepping of wheels 26 and 32 through pawls 24 and 30 and the holding of shaft 28 in the angularly displaced position by detent 34.

After dialing, the central office reads out the amount of deposit required. This is accomplished by transmitting a signal over the loop conductors T and R to the coin control receiving circuit to operate the TR1 contact of the tuned reed relay TR. This signal may be transmitted by an operator or by any conventional means which will automatically respond to a dialed signal. Coins having been deposited, contact S1 controlled by cam S on the storage section of the totalizer mechanism will be closed as illustrated in FIG. 2. With contacts TR1 and S1 closed advance relay AR will be energized by means of the circuit including battery 38, operated contacts TR1 and S1, and normally closed contacts AR1 and ER2. Each time relay AR is energized, contact AR5 closes to release relay TR and contact TR1. Relay AR then releases and contact AR5 opens to permit relay TR to be reenergized. Relay AR is driven one step at a time under control of the central office through the operation of contact TR1 to cause pawl 40 to step wheel 42 in a clockwise direction until cam S returns to its neutral position and causes contact S1 to open. Each time relay AR is energized contact AR4 transfers, thereby energizing oscillator 36 and causing a recognition signal to be transmitted to the central office in the manner described heretofore. The recognition signals are stored in the central office and compared with charge indicating signals in accordance with the value of the completed call. This may be done in the manner disclosed hereinbelow in connection with the description of FIG. 6, or by any other conventional means. If the deposit is sufficient the call will be completed through the central office. If the deposit is insufficient the signal comparing facilities in the central office will either call in an operator to monitor a correct deposit, or call in another signal generator to operate the insufficient deposit display located at the pay station.

*Insufficient Deposit Display*

To operate the insufficient deposit display, the central office will transmit a second signal to the coin control receiving circuit to operate contact TR2′ of tuned reed relay TR′. With contact TR2′ operated and contact SH2 transferred, since the telephone handset is off-hook, relay AR will be energized by means of the circuit including battery 38, operated contacts TR2′ and SH2, and normally closed contacts AR1 and ER2. Each time relay AR is energized contact AR5 closes to release relay TR′ and contact TR2′. Relay AR then releases and contact AR5 opens to permit relay TR′ to be reenergized. Relay AR is driven one step at a time under control of the central office through the operation of contact TR2′ to cause pawl 40 to step wheel 42 in a clockwise direction and advance the deposit display the required amount. Cam F will be rotated off its neutral position and contacts F1 and F2, shown in FIG. 3, will close. The advance solenoid 44 is then energized by means of the circuit including battery 38, and operated contacts F1 and AR3. As previously described, each time relay AR is energized a recognition signal is transmitted to the central office and contact AR3 is closed to energize the advance solenoid. The solenoid will step the insufficient deposit display 46 one increment at a time until the number of steps advanced by the display compares with the insufficient deposit indicating signals stored at the central office. Switch D which is mechanically linked to insufficient deposit display 46, operates as soon as display 46 moves off-normal to indicate the first increment of insufficient deposit. Make contact D21, operated by switch D, closes to provide current for lighting insufficient deposit display 46. Additionally the closing of contact D21 prepares a path for energizing erase solenoid 48 and erasing the display through contact ER3 when the required additional coins are deposited.

After the insufficient deposit display is operated, the required coin deposit will energize relay ER and cause pawls 24 and 30 to step shafts 16 and 28 to neutral, and at the same time, provide transient tone pulses to the central office to indicate the amount of deposit in the manner previously described. The erase solenoid will return the display to neutral on being energized through the circuit including battery 38 operated contact F1, closed contact D21 and intermittently operated contact ER3. When the cam F on shaft 28 returns to its neutral position contacts F1 and F2 will open. The central office will register the required number of tone pulses and temporarily store this information in the coin memory at the central office until the called party answers. If no deposit is made or if a partial deposit is registered the circuits for registering tone pulses will time out and call in an operator to monitor the call. If an overdeposit is made, the excess will be refunded automatically when the call is terminated.

The nature of the central office equipment which may be employed in accordance with the invention to cooperate with the circuit shown in FIG. 1 has up to this point been described in general terms only. One illustrative form of such equipment is shown in detail in FIG. 6. Briefly, the equipment shown in FIG. 6 includes means for generating insufficient deposit signals and refund signals for transmission to the local coin operated telephone station, such means being controlled by suitable logic means.

Figure 6:
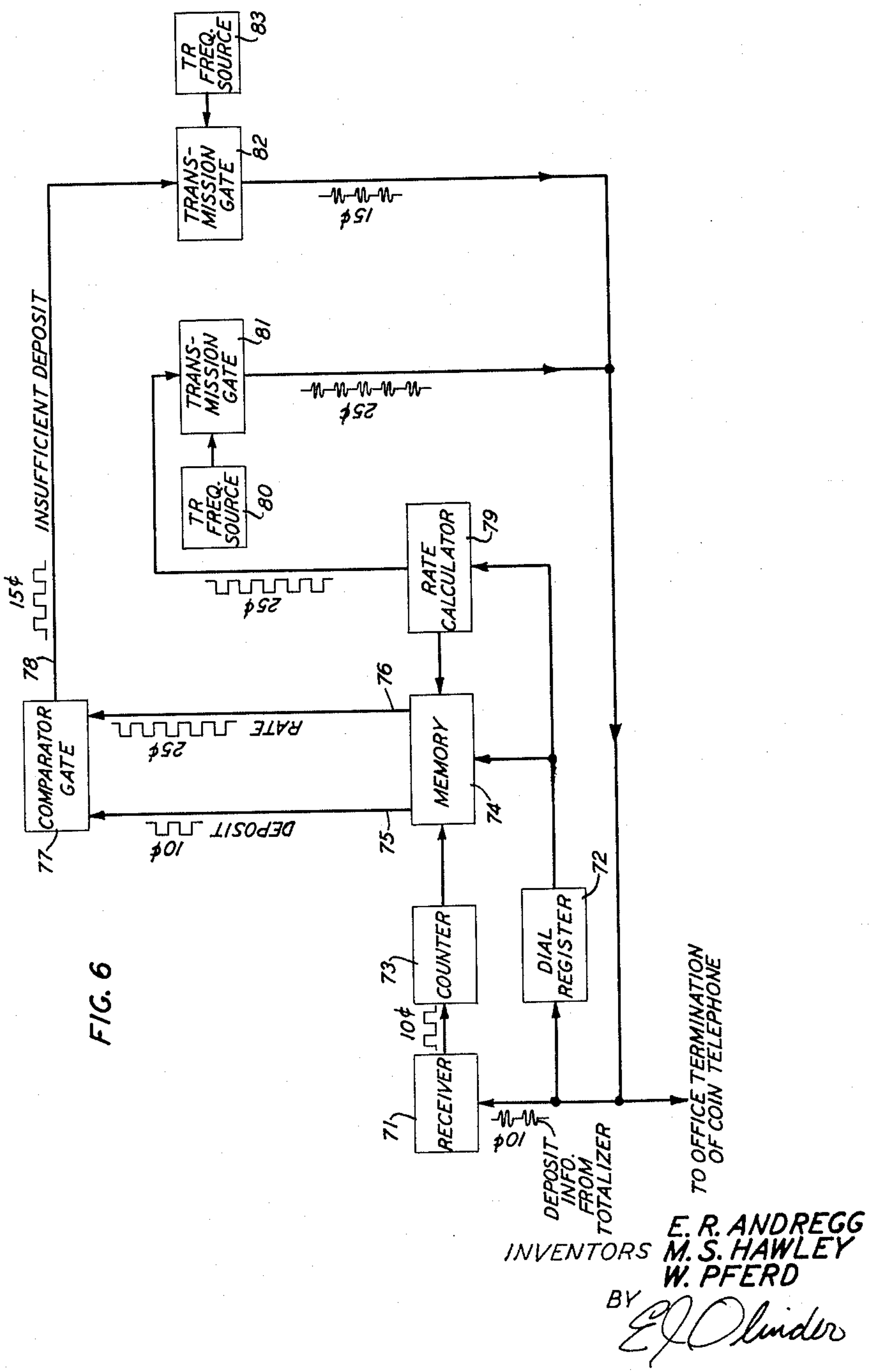
FIG. 6 is a detailed block diagram of a part of the central office equipment shown as a single block in FIG. 1.

The equipment shown in FIG. 6 may best be described by tracing an illustrative operating cycle. Assume, for example, that the customer has taken the receiver off-hook and has made a ten cent deposit. The central office equipment recognizes the start by the completion of the loop closure and associates dial register 72 with the line. Up to this point operation follows conventional central office practice. Pulses received by dial register 72 are in turn applied to a temporary memory 74, which may be of any conventional form such as a magnetic core array for example, and also to rate calculator 79 which may be of a type conventionally employed in automatic message accounting systems. Rate calculator 79 computes from the dialed number information, and from the information concerning the subscriber's line, the rate for the call. In this example it is assumed that the call rate is twenty-five cents. Rate information is applied from rate calculator 79 to memory 74 for temporary storage and additionally the rate information in the form of five discrete D.-C. pulses is applied to transmission gate 81. A second input to transmission gate 81 is from TR frequency source 80. The output of transmission gate 81 is a series of five tone pulses which are in turn applied to the line for transmission to the pay station. These pulses are of the proper frequency to operate tuned relay TR (FIG. 1), in step-by-step fashion, causing the stored coin information to be read out in nickel increments from the pay station, as previously described. The deposit in the instant example was assumed to be ten cents and accordingly the signals from the pay station comprise two tone bursts. More specifically, the first two pulses from TR frequency source 80 at the central office drive the totalizer back two steps and the final three pulses are ignored.

The signals sent from the pay station to the central office, which signals are of a unique frequency, are applied to receiver 71 which is also associated with the line. Receiver 71 detects two frequency bursts, indicative of a ten cent deposit, and converts these bursts into a pair of direct current pulses which are applied as an input to counter 73. These two pulses are counted by counter 73 and suitably translated for input to memory 74 where they are temporarily stored. As soon as the last signal from the pay station is received and a suitable time-out period occurs, memory 74 simultaneously applies two deposit pulses and five rate pulses to comparator gate 77, which may be a simple inhibit gate, for example, by way of leads 75 and 76, respectively. With a charge rate of twenty-five cents and a deposit of ten cents, the output of comparator gate 77 is a series of three D.-C. pulses indicative of an insufficient deposit of fifteen cents. The insufficient deposit signal is applied to transmission gate 82 which has a second input from TR′ frequency source 83. Accordingly, the output of transmission gate 82 is a series of three tone bursts of the proper frequency for the operation of tuned relay TR′ (FIG. 1). Tuned relay TR′ in operating three times in response to the three pulses in the insufficient deposit signal, causes three nickel increments to be stored on insufficient deposit display 46, thereby alerting the customer to the fact that his deposit is insufficient by fifteen cents.

At this point, receiver 71 is left on the line awaiting customer deposit signals. If the customer deposit does not occur within a suitable time period, a conventional time-out arrangement may be employed to call in an operator. If the customer does make a deposit, however, within the alloted time period, the supplementary fifteen cent deposit is then employed to erase insufficient deposit display 46 and additionally the coin signals generated as described above are received by receiver 71 and converted to D.-C. pulses. These pulses are counted by counter 73 and stored in memory 74 along with previous coin deposit information, the new total coin deposit information in this instance being twenty-five cents.

At the conclusion of the sequence of operations described immediately above, a suitable time-out arrangement may be employed to cause the deposit and charge information to be read out again from memory 74 into comparator gate 77. In this instance, the number of deposit pulses matches the number of rate pulses and, accordingly, no insufficient deposit signal is generated by comparator gate 77. The absence of a signal from comparator gate 77 at this time may be employed as a notice to the central office sender (not shown) to place the call.

If the called party does not answer, central office memory 74 still retains information indicative of deposits totaling twenty-five cents. Such information must be transmitted back to the local pay station in order to provide the customer with the refund to which he is entitled. This action is accomplished when the customer hangs up by the central office recognizing an abandoned call in the usual fashion, which recognition is employed to initiate the read-out of memory 74 in the form of five D.-C. pulses which are employed to operate transmission gate 81. Consequently, five tone pulses from TR frequency source 80 are applied to the line. These tone pulses are then employed to operate the totalizer and a refund of twenty-five cents is directed to the customer in the usual fashion. The coin deposit information, rate information and dial information is then erased from memory 74, placing it in condition for the next call.

*Refunding and Change Making*

If the call is completed, the pay station circuit automatically refunds the amount of overdeposit stored on shaft 28. If the call is incomplete, the circuit automatically refunds the amount of overdeposit and then responds to signals from the central office to refund the amount registered in the temporary coin information storage at the central office.

When the subscriber hangs up, switch SH3 closes. If an overdeposit is made, cam S will be rotated in a counterclockwise direction beyond its neutral position and contact S2 will be closed. Slow operate relay SO will then be energized through a circuit including battery 38, normally closed switch contact SH3, operated contact S2 and normally closed contact ER2. When relay SO operates contacts SO1 and SO2 close and relay AR is energized through a circuit including battery 38, normally closed contact SH3, operated contacts S2, SO2 and SO1 and normally closed contacts AR1 and ER2. Contact SO3 closes to lock up relay SO until coin changing is completed, and contact SO4 opens to prevent the manipulation of relay ER by coin deposits for fraudulent purposes. Relay AR, on operating, steps shaft 28 back to the neutral position in the manner previously described at which time contact S2 opens to prevent further stepping. At the same time the X, Y and Z program cams on shaft 28 operate the nickel, dime and quarter contacts in the proper sequence to refund the correct change.

The coin disposal control arrangements to be described require coin deposits to be separated by coin denomination in a slug rejector and coin segregating device (not shown), to then pass through the totalizing mechanism, and then be deposited in individual coin storage tubes in anticipation of a refund. The mechanical means 54 shown in FIG. 5 for storing coins used for refunding purposes and ejecting coins in response to an electrical control signal may comprise a storage tube 56 and an overflow chute 58 leading to a coin bank. When the storage tube becomes full, the last coin entering the tube may deflect a counterbalanced trigger mechanism 60 into the path of succeeding coins so that any additional coins will be directed into the overflow chute and the coin bank. When the height of coins in the storage tube or cylinder falls below a predetermined level due to a coin having been refunded from the bottom of the stack, the counterbalanced trigger mechanism will permit additional coins to be stored. Coins may be ejected from the bottom of the coin stack into the refund chute by a slide ejection mechanism 62 operated by a solenoid, the energization of which is controlled by program cams X, Y and Z.

A typical coin change program in which the least number of coins are returned is illustrated in FIG. 4. The coin change program sequence can be best understood by following through the sequence for a typical example. Let it be assumed that forty-cents overdeposit is to be refunded, the handset has just been placed on-hook, relay SO is operated, and the coin change sequence is ready to begin. Shaft 28 will have been stepped back eight times by relay ER, the contact controlled by cam X is closed and the contacts controlled by cams Y and Z are open or in the normal position. The five-cent solenoid is energized and its associated contact C1 is operated when potential is applied from battery 38 through operated contacts SO3, S2, SO2, normally closed contact *b*1, operated contact X and normally closed contacts *a*2 and ER2. At the same time potential is applied to relay AR through contacts SO3, S2, SO2, SO1, AR1 and ER2. Relay AR, on operating, steps shaft 28 to position 7, at which time contact *y* closes and contact X opens. The five-cent solenoid completes its action through contact C1, and contact AR2 opens. When relay AR releases, contact AR2 closes to energize the ten-cent solenoid through a path comprising contacts SO3, S2, SO2, AR2, *y*, *a*2 and ER2. Contact *b*1 transfers thereby releasing the five-cent solenoid and preparing a path to lock up the ten-cent solenoid. Relay AR, on operating again, steps shaft 28 to position 6, at which time, contact *y* transfers back to normal to lock up the ten-cent solenoid through contacts *b*1, SO2, S2, SO3, ER2 and *a*2. Contact X closes, but the five-cent solenoid does not operate since contact *b*1 is transferred. Relay AR releases thereby closing contact AR2. On operating again, relay AR steps shaft 28 to position 5, at which time contact X opens, contact *y* remains normal, contact Z transfers and contact AR2 opens. On releasing relay AR again causes contact AR2 to close thereby operating the twenty-five-cent solenoid through a path comprising contacts SO3, S2, SO2, AR2, Z, *a*2 and ER2. Contact *a*1 closes while contact *a*2 opens. Relay AR operates again to open contact AR2 and step shaft 28 to position 4, at which time contact *y* transfers, and contact Z transfers to lock up the twenty-five-cent solenoid through contacts Z, *a*1, SO2, S2, SO3 and ER2. With contact *y* transferred, the ten-cent solenoid does not operate when relay AR releases to close contact AR2 because contact *a*2 is open. The twenty-five-cent solenoid remains locked up while relay AR steps shaft 28 back to the neutral position and open contact *a*2 prevents the operation of the five- and ten-cent solenoids. When the storage shaft 28 is in the neutral position switch S2 opens. Relay AR releases to open contact AR6 and thereby release the twenty-five-cent solenoid. Contact AR6 was included to insure complete action of the five-cent solenoid when a single nickel refund is to be given. When contact AR6 opens on the last step, relay SO also releases.

The coin change sequence can, of course, be altered by changing the X, Y and Z program cams. However, the sequence described may be preferred if the least number of coins are to be returned.

It is to be understood that the above-described arrangements are illustrative of the application of the principles of the invention. Other arrangements may be devised by those skilled in the art without departing from the spirit and scope of the invention.

What is claimed is:

1. In a telephone pay station connected by a line to a central office, a receiver-transmitter in off-hook condition, a rotatable control mechanism comprising first and second members, said members having a common neutral position, a source of potential, said first member being actuated directly by deposited coins to rotate in one direction, stepping means for rotating said first and second members simultaneously in the other direction through an arc corresponding to the value of the deposited coins, means for energizing said stepping means, said means comprising said source of potential, said potential being applied to said stepping means on completion of rotation of said first member in said one direction, said first member being stepped to its neutral position, said second member being stepped beyond its neutral position, means responsive to a first frequency connected to said line, means responsive to a second frequency connected to said line, a signal generator connected to said line, means in said central office responsive to called station designating pulse signals for energizing said first frequency responsive means, means responsive to said energized first frequency responsive means for stepping said second member to its neutral position, and enabling said generator to transmit signals to the central office indicating the amount of deposit, means at said central office for comparing said transmitted signals with stored signals representing the called station, insufficient deposit display means, means at said central office for energizing said second frequency responsive means when said comparison indicates an insufficient deposit, means for stepping said second member off neutral in said one direction through an arc corresponding to the required additional deposit, circuit means for energizing said stepping means and for actuating said display means to indicate the portion of required additional deposit corresponding to each rotational step of said second member, said circuit means comprising said source of potential and means responsive to said energized second frequency responsive means.

2. A telephone pay station in accordance with claim 1 wherein the signal transmitted to the central office indicating the amount of deposit comprises a plurality of pulses, and each of said pulses corresponds to a rotational step of said second member.

3. A telephone pay station in accordance with claim 1 wherein said first and second control mechanism members are coaxially disposed, and said stepping means comprise ratchet and pawl means.

4. In a telephone pay station in accordance with claim 1 wherein additionally deposited coins actuate said first member in one direction and stepping means are energized on completion of rotation of said member to step said member in the other direction to its neutral position, means for returning said display means to its non-indicating condition, said means comprising said source of potential and switch means actuated by said stepping means.

5. A telephone pay station in accordance with claim 1 wherein additionally deposited coins actuate said first member in said one direction, said potential is applied to said stepping means on completion of rotation of said first member, and said first and second members are thereby stepped simultaneously to their neutral position.

6. A telephone pay station in accordance with claim 1 wherein coins representing an excessive additional deposit actuate said first member in said one direction through an arc corresponding to the value of the deposited coins, said potential is applied to said stepping means on completion of rotation of said first member, and said first and second members are stepped simultaneously in the other direction, said first member returning to its neutral position, said second member rotating beyond its neutral position through an arc corresponding to the overdeposit.

7. In a telephone pay station in accordance with claim 6 wherein said receiver-transmitter is returned to on-hook condition, and said second member comprises a plurality of control elements mounted thereon and rotatable therewith, means for refunding said overdeposit comprising a coin storage device including a plurality of coin ejecting mechanisms, each of said mechanisms being responsive to an associated actuating means, means for stepping said second member to neutral, circuit means for energizing said stepping means, said circuit means comprising said source of potential, a first switch actuated when said receiver-transmitter is on-hook, and a second switch actuated when said second member is rotated off neutral, circuit means for energizing said ejecting mechanism actuating means, said circuit means comprising said source of potential and a plurality of switches associated with said control elements, each of said switches being actuated by its associated element in a manner predetermined for each rotational step of said second member.

8. In a telephone pay station in accordance with claim 6 wherein said receiver-transmitter is returned to on-hook condition, and said second member comprises a control element mounted thereon and rotatable therewith, means for refunding said overdeposit comprising a coin storage device including a coin ejecting mechanism, said mechanism being responsive to an associated actuating means, means for stepping said second member to neutral, circuit means for energizing said stepping means, said circuit means comprising said source of potential, a first switch actuated when said receiver-transmitter is on-hook, and a second switch actuated when said second member is rotated off neutral, circuit means for energizing said ejecting mechanism actuating means, said circuit means comprising said source of potential and a switch associated with said control element, said switch being actuated by said element in a manner predetermined for each rotational step of said second member.

9. A telephone pay station comprising a control mechanism having a neutral position and rotatable through an arc corresponding to the value of deposited coins, a source of potential, a receiver-transmitter in on-hook condition, said control mechanism comprising a plurality of control elements mounted thereon and rotatable therewith, said mechanism being rotated off neutral through an arc corresponding to an overdeposit, means for refunding said overdeposit comprising a coin storage device including a plurality of coin ejecting mechanisms, each of said mechanisms being responsive to an associated actuating means, means for stepping said control mechanism to neutral, circuit means for energizing said stepping means, said circuit means comprising said source of potential, a first switch actuated when said receiver-transmitter is on-hook, and a second switch actuated when said control mechanism is rotated off neutral, circuit means for energizing said ejecting mechanism actuating means, said circuit means comprising said source of potential and a plurality of switches associated with said control elements, each of said switches being actuated by its associated element in a manner predetermined for each rotational step of said control mechanism.

10. A telephone pay station comprising a control mechanism having a neutral position and rotatable through an arc corresponding to the value of deposited coins, a source of potential, a receiver-transmitter in on-hook condition, said control mechanism comprising a control element mounted thereon and rotatable therewith, said mechanism being rotated off neutral through an arc corresponding to an overdeposit, means for refunding said overdeposit comprising a coin storage device including a coin ejecting mechanism, said mechanism being responsive to an associated actuating means, means for stepping said control mechanism to neutral, circuit means for energizing said stepping means, said circuit means comprising said source of potential, a first switch actuated when said receiver-transmitter is on-hook, and a second switch actuated when said control mechanism is rotated off neutral, circuit means for energizing said ejecting mechanism actuating means, said circuit means comprising said source of potential and a switch associated with said control element, said switch being actuated by said element in a manner predetermined for each rotational step of said control mechanism.

References Cited in the file of this patent

UNITED STATES PATENTS

| | | |
|---|---|---|
| 2,000,804 | Wehren | May 7, 1935 |
| 2,020,466 | Hatton | Nov. 12, 1935 |
| 2,082,561 | Appelius | June 1, 1937 |
| 2,224,702 | Seidel | Dec. 10, 1940 |
| 2,623,950 | Ungar | Dec. 30, 1952 |
| 2,889,404 | Oglietti et al. | June 2, 1959 |
| 2,935,567 | Anderson | May 3, 1960 |